United States Patent [19]
Jackson et al.

[11] Patent Number: 5,978,474
[45] Date of Patent: Nov. 2, 1999

[54] COIN TELEPHONE PROTECTION DEVICE

[75] Inventors: Raymond Gene Jackson, Indianapolis; Daniel Warren Macauley, Fishers; Robert Anderson Till, Plainfield; Ronald Lee Wild, Carmel, all of Ind.

[73] Assignee: Lucent Technologies Inc., Murray Hill, N.J.

[21] Appl. No.: 08/964,340

[22] Filed: Nov. 4, 1997

Related U.S. Application Data

[60] Provisional application No. 60/053,538, Jul. 23, 1997.

[51] Int. Cl.$^6$ .................. H04M 1/00; H04M 17/00
[52] U.S. Cl. .................. 379/451; 379/437; 379/145
[58] Field of Search .................. 379/145, 146, 379/437, 451

[56] References Cited

U.S. PATENT DOCUMENTS 5,787,158  7/1998  Anello et al. .................. 379/145

*Primary Examiner*—Jack Chiang

[57] ABSTRACT

A linkage couples the coin return door of a coin telephone instrument to a cam mounted in the coin return chute. When the coin return door is opened in the normal manner by a customer to retrieve coins from the coin return hopper, the cam closes a contact of a microswitch that completes a circuit. After a normal coin retrieval the door closes and the switch contact returns to open. Such momentary switch closures are considered normal. However, if foreign matter has been stuffed into the coin return hopper by a fraudulent user, the material will be engaged by a comb at the end of the cam, preventing the coin return door from closing normally. When the door is prevented from closing normally and remains open for more than a few moments, the switch remains actuated, keeping the circuit closed for longer than normal thereby signaling the signaling the telephone company that the phone has been tampered with.

4 Claims, 2 Drawing Sheets

COIN TELEPHONE PROTECTION DEVICE

This application claims the benefit of U.S. Provisional application Ser. No. 60/053538 filed Jul. 23, 1997.

FIELD OF THE INVENTION

This invention relates to coin fraud countermeasures and, more particularly, to the protection of coin telephone instruments against fraudulent usage.

BACKGROUND OF THE INVENTION

A species of coin fraud has arisen in which a fraudulent user accesses the coin return hopper of a coin telephone instrument and stuffs the hopper with a wad of material which interferes with the normal function of the instrument to return deposited coins. Fraudulent users do so in the expectation that subsequent legitimate users will be prevented from retrieving coins that should be returned to them so that coins will accumulate behind the blocking wad. Legitimate customers may thus falsely be led to believe that the telephone company inadvertently or deliberately neglected to return their coins. After a while, the fraudulent user returns to the vandalized telephone instrument, removes the blockage and retrieves the fraudulently stored coins. Apparently, two different techniques have been employed by fraudulent users. In one, a balloon is inflated inside the coin return hopper after the coin return door has closed. In the other, a wad of stuffing material is inserted into the coin return hopper and a tool used to force the coin return door to close. While devices have apparently been devised to inhibit coin return hopper stuffing, it appears that such devices tend to jam the coin return chute when a large number of coins are required to be returned to a legitimate user, thereby necessitating that a technician be dispatched by the telephone company to clear the coin path. It would be advantageous to overcome the difficulties of prior art methods of attempting to prevent coin return hopper stuffing.

SUMMARY OF THE INVENTION

In accordance with one illustrative embodiment of the principles of the present invention, instead of simply attempting by mechanical contrivances to prevent coin box stuffing, a detection mechanism is provided which signals the telephone company that the coin return path has been blocked. A linkage coupled to the coin return door is actuated by the opening of the coin return door to cause one lobe of a cam to sweep through an area of the coin return path inside the coin return hopper. The cam lobe contains a comb adapted to engage the foreign material stuffed into the coin return hopper by the fraudulent user. So long as the foreign material remains in the coin return chute engaged by the comb on the cam lobe, the coin return door is prevented from closing. When the coin return door is opened in the normal manner by a customer to retrieve coins from the coin return hopper, a finger of the cam closes a contact of a microswitch that completes a circuit that signals the telephone company. After a normal coin retrieval the door closes and the switch contact returns to open. Such momentary switch closures are considered normal. However if the door is prevented from closing the microswitch remains actuated for longer than the normal interval maintaining closed the circuit which informs the telephone company that the telephone has been tampered with. In addition, while the coin return door is held open a normally hidden edge of the coin return door becomes visible to the user which displays a warning legend that the telephone has been tampered with.

DESCRIPTION OF THE DRAWING

The foregoing and other features of an illustrative embodiment may become more apparent when the ensuing description is read together with the drawing, in which.

GENERAL DESCRIPTION

Figure 1:
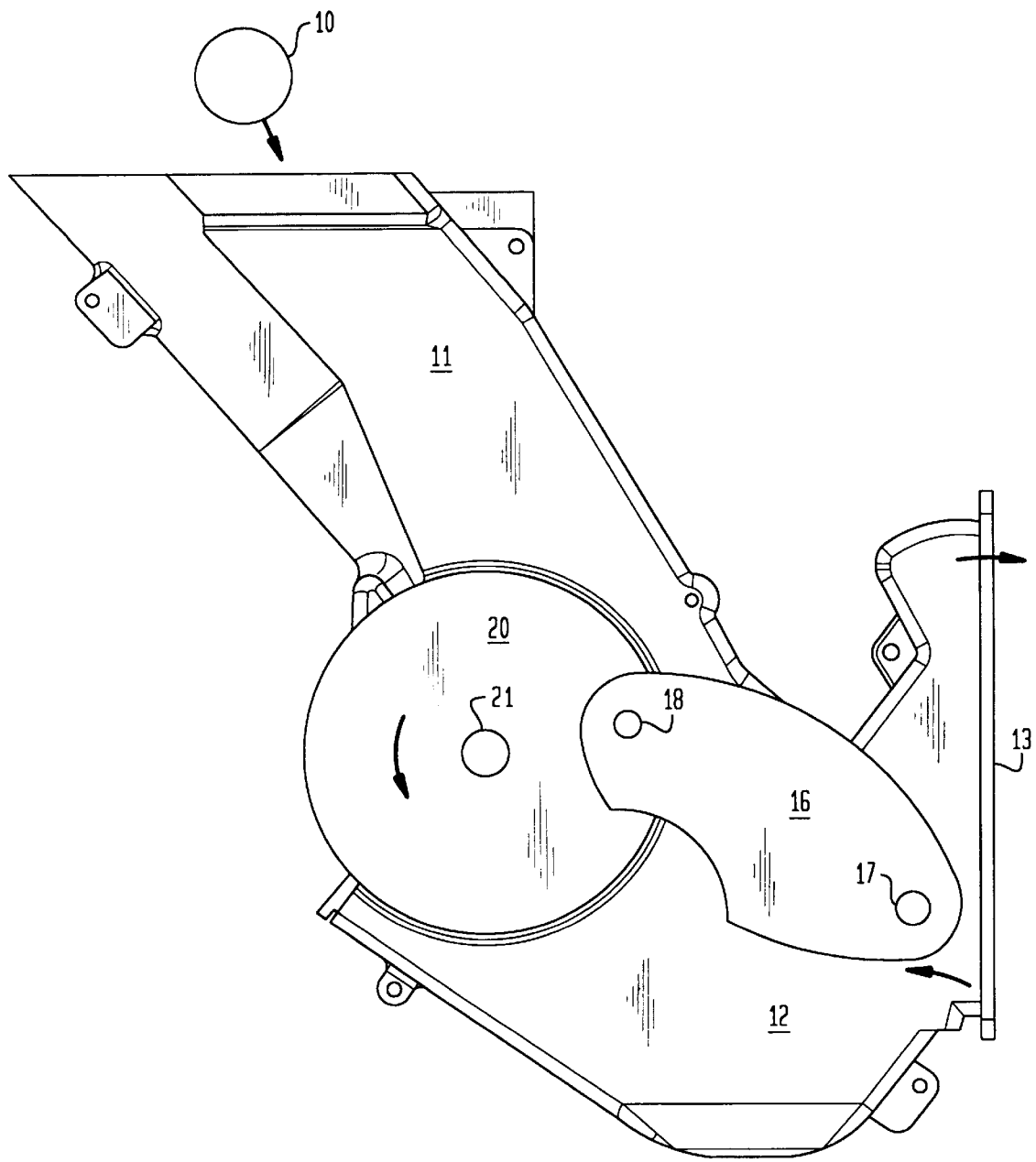
FIG. 1 is a left-side view of a coin return chute, coin return hopper and coin return hopper door showing the linkage of the illustrative embodiment.

In FIG. 1, a coin 10 that is to be returned to a user of the coin telephone instrument enters at the top of coin return chute 11 and falls into coin return hopper 12. Access to coin return hopper 12 may then be obtained by the user pushing to the left at the lower edge of coin return hopper door 13. Coin return hopper door 13 then rotates clockwise about hinge 15 allowing the customer to retrieve any coins that have dropped into the bottom of hopper 12. While blocking of the coin return chute 11 is inhibited by flapper 14, unfortunately, however, unscrupulous individuals sometimes block the coin return hopper 12 by stuffing it with a wad of foreign material. With the coin return hopper 12 blocked the miscreant later returns and retrieves whatever coins have accumulated. In accordance with the illustrative embodiment this scheme may be frustrated by providing a linkage 16, 20, 21, 22 to coin return door 13 that facilitates the sensing of when the coin return hopper 12 has been blocked. The righthand end of coupling 16 is journaled to pin 17 at the lower part of the sidewall of door 13. The lefthand end of coupling 16 is journaled to pin 18 of wheel 20. When door 13 is rotated clockwise about pin 15 incident to the lower part of door 13 being pushed to the left to provide access to hopper 12, coupling 16 causes wheel 21 to rotate counterclockwise. Shaft 21 transfers the rotational motion of wheel 20 to cam 22 shown in FIGS. 2, 3 and 4. A comb 24, whose purpose will hereinafter be described, is located at the end of cam 22.

Figure 2:
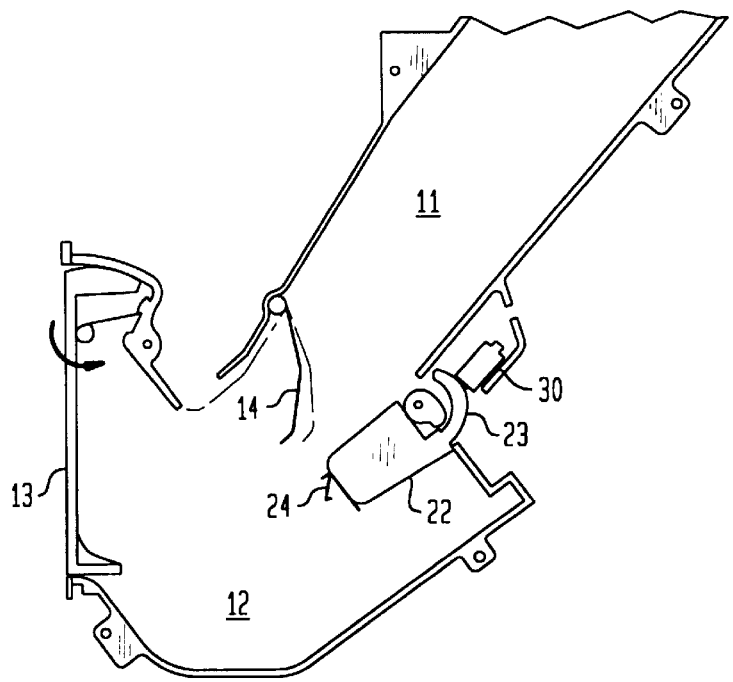
FIG. 2 shows a right-side sectional view of the apparatus of FIG. 1 showing the coin return hopper door closed.

In FIG. 2, cam 22 is shown in its normal position with coin return door 13 closed. In this normal position, a finger 23 of cam 22 makes contact with microswitch 30. In normal operation by a legitimate user, the coin return door 13 will remain open for only short interval of time sufficient for the user to retrieve returned coins lying in hopper 12. Switch 30 normally maintains open a circuit (not shown) that informs the telephone company that the coin telephone has not been tampered with. Should finger 23 lose contact with switch 30 the normally open circuit will be closed. If the circuit remains closed more than a few moments this serves to inform the telephone company that the coin telephone instrument has been tampered with.

Figure 3:
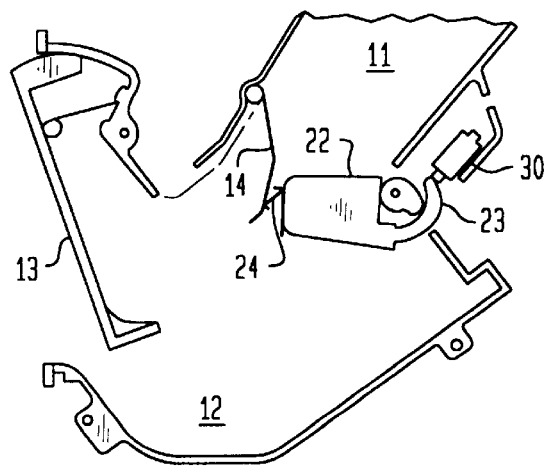
FIG. 3 shows a right-side sectional view of the apparatus of FIG. 1 showing the coin return hopper door partially opened.
Figure 4:
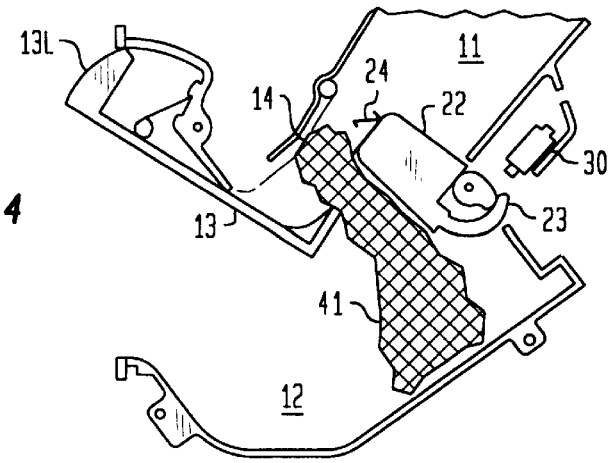
FIG. 4 shows a right-side sectional view of the apparatus of FIG. 1 showing the coin return hopper door latched in the fully opened position by a fraudulent attempt at stuffing.

FIG. 3 shows coin return door 13 in a partly opened position which allows the legitimate user access to reclaim coins from hopper 12. In this position, finger 23 of cam 22 maintains switch 30 in its normal position as nothing untoward has yet occurred. In FIG. 4, however, the miscreant has inserted a wad of material 41 into coin return hopper 12 and pushed it between flapper 14 and comb 24, causing comb 24 to snag the foreign material 41 thereby preventing cam 22 and door 13 from returning to their normal positions. At this point, finger 23 of cam 22 is no longer in contact with microswitch 30, causing it to be actuated and to close the aforementioned electrical circuit (not shown). If the circuit remains closed more than a few moments it indicates to the telephone company that the instrument has been tampered with. In addition, rotation of cam 22 beyond its normal ambit causes door 13 which is linked to cam 22 (see FIG. 1) to also be rotated beyond its normal ambit. When so rotated, normally hidden edge 13L of door 13 becomes open to view and exposes a warning legend informing the user that the telephone has been tampered with.

What has been described is deemed to be illustrative of the principles of the invention. It should be understood that further and other modifications will be apparent to those skilled in the art without, however, departing from the spirit and scope of the invention.

What is claimed is:

1. An anti-fraud protection device for a coin telephone having a coin return hopper that is accessible to a user by opening a hinged hopper door, comprising:

a cam linked to said hinged hopper door, said cam being adapted to sweep through an area above said coin return hopper when said door is opened normally to allow retrieval of coins from said hopper;

a comb mounted on said cam, said comb being adapted to engage foreign material fraudulently stuffed introduced into said coin return hopper and switch means actuatable by said cam sweeping through an additional area after said comb engages said foreign material to inform the telephone company that the coin telephone has been tampered with.

2. An anti-fraud protection device for a coin telephone according to claim 1 wherein said comb engaging said foreign matter prevents said door from closing normally to inform users that the coin telephone has been tampered with.

3. An anti-fraud protection device according to claim 2 wherein said door includes a fraud warning legend made visible when said cam is rotated through said additional area.

4. An anti-fraud protection device according to claim 1 wherein said telephone instrument includes a coin return chute having a hinged flapper plate above said coin return hopper and wherein said cam is adapted to engage said foreign material between said comb and said flapper plate.

* * * * *